(12) United States Patent
Okino et al.

(10) Patent No.: US 9,594,362 B2
(45) Date of Patent: Mar. 14, 2017

(54) ENERGY MANAGEMENT SYSTEM, ENERGY MANAGEMENT APPARATUS, AND POWER MANAGEMENT METHOD

(71) Applicant: KYOCERA CORPORATION, Kyoto (JP)

(72) Inventors: Kenta Okino, Yokohama (JP); Kei Iwata, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 440 days.

(21) Appl. No.: 14/348,034

(22) PCT Filed: Sep. 28, 2012

(86) PCT No.: PCT/JP2012/075250
§ 371 (c)(1),
(2) Date: Mar. 27, 2014

(87) PCT Pub. No.: WO2013/047842
PCT Pub. Date: Apr. 4, 2013

(65) Prior Publication Data
US 2014/0244064 A1     Aug. 28, 2014

(30) Foreign Application Priority Data
Sep. 28, 2011    (JP) .................................. 2011-213566

(51) Int. Cl.
*G05B 15/02* (2006.01)
*H01M 8/04* (2016.01)
(Continued)

(52) U.S. Cl.
CPC ............. *G05B 15/02* (2013.01); *G06Q 50/06* (2013.01); *H01M 8/04955* (2013.01);
(Continued)

(58) Field of Classification Search
None
See application file for complete search history.

(56) References Cited

U.S. PATENT DOCUMENTS

2005/0142405 A1    6/2005    Nagamitsu et al.
2006/0051633 A1    3/2006    Tanaka et al.
(Continued)

FOREIGN PATENT DOCUMENTS

JP    2002-152976 A    5/2002
JP    2002-190308 A    7/2002
(Continued)

OTHER PUBLICATIONS

Extended European Search Report dated Aug. 19, 2015, issued by the European Patent Office for Counterpart European Application No. EP 12835626.8.
(Continued)

*Primary Examiner* — Isaac T Tecklu
(74) *Attorney, Agent, or Firm* — Procopio Cory Hargreaves and Savitch LLP (57) ABSTRACT

An energy management system 1 comprises a control unit 540 that, when a unit price of the fuel cell is higher than a power purchase unit price, controls an SOFC 110 in a restrained state where output of the SOFC 110 is restrained.

9 Claims, 6 Drawing Sheets (51) Int. Cl.
  *H02J 3/00* (2006.01)
  *H02J 3/38* (2006.01)
  *G06Q 50/06* (2012.01)
  *H01M 8/12* (2016.01)

(52) U.S. Cl.
  CPC .............. *H02J 3/008* (2013.01); *H02J 3/387* (2013.01); *H01M 2008/1293* (2013.01); *Y02E 60/525* (2013.01); *Y04S 50/10* (2013.01)

(56) References Cited

U.S. PATENT DOCUMENTS

2010/0304237 A1  12/2010  Ishida
2014/0127598 A1   5/2014  Ishida

FOREIGN PATENT DOCUMENTS

| JP | 2005-130550 A | 5/2005 | |
|---|---|---|---|
| JP | 2005-327513 A | 11/2005 | |
| JP | 2007-104775 A | 4/2007 | |
| WO | 2003/075427 A1 | 9/2003 | |
| WO | 2008/136480 A1 | 11/2008 | |
| WO | WO 2013047842 A1 * | 4/2013 | ............. G06Q 50/06 |

OTHER PUBLICATIONS

International Search Report; PCT/JP2012/075250; Dec. 4, 2012.
An Office Action; "Decision of Rejection," issued by the Japanese Patent Office on Mar. 31, 2015, which corresponds to Japanese Patent Application No. 2011-213566 and is related to U.S. Appl. No. 14/348,034; with English language statement of relevance.

* cited by examiner

ENERGY MANAGEMENT SYSTEM, ENERGY MANAGEMENT APPARATUS, AND POWER MANAGEMENT METHOD

TECHNICAL FIELD

The present invention relates to an energy management system provided with a fuel cell, an energy management apparatus, and a power management method.

BACKGROUND ART

In recent years, it is known a technology of controlling, for example, a load provided in a consumer or a dispersed power source provided in a consumer by a power management apparatus (for example, HEMS: Home Energy Management System) provided in each consumer.

Examples of the dispersed power source may include a fuel cell unit including a fuel cell such as an SOFC (Solid Oxide Fuel Cell). Examples of the dispersed power source may include a power generation equipment that utilizes clean energy such as sunlight, wind power, or geothermy.

In this case, generally, power supplied from the fuel cell is controlled to follow power consumption of the load provided in the consumer.

Further, a technology of reducing a price selected by a user or $CO_2$ emission by changing a type of power supply that supplies power to each load and operation time of each load, is also proposed (for example, Patent Literature 1).

Meanwhile, when the output of the fuel cell is decreased, the power generation efficiency of the fuel cell is decreased. That is, in a state where the output of the fuel cell is low, the unit price of power generation of the fuel cell is increased. Therefore, it should be considered which is more appropriate to use power supplied from a grid and the power supplied from the fuel cell, or power generated by another power generation equipment. In other words, there is a case where advantage cannot be gained in terms of price by only following the power consumption of the load and controlling the fuel cell.

CITATION LIST

Patent Literature

Patent Literature 1: Japanese Patent Application Publication No. 2007-104775

SUMMARY OF THE INVENTION

An energy management system according to the first feature is provided with a fuel cell. The energy management system comprises: a control unit that controls the fuel cell; and an acquisition unit that acquires a power purchase unit price required for receiving supply of unit power from a grid and a unit price of the fuel cell required for the fuel cell to generate unit power. When the unit price of the fuel cell is higher than the power purchase unit price, the control unit controls the fuel cell, in a restrained state where output of the fuel cell is restrained.

In the first feature, the energy management apparatus is connected to a photovoltaic cell. The acquisition unit acquires a power selling unit price of unit power generated by the photovoltaic cell. When the unit price of the fuel cell is higher than the power selling unit price, the control unit controls the fuel cell, in the restrained state.

In the first feature, exhaust heat generated by an operation of the fuel cell is used for warming water by a hot water supply unit. The control unit corrects the unit price of the fuel cell on the basis of use efficiency of the exhaust heat, and uses the corrected unit price of the fuel cell as the unit price of the fuel cell.

In the first feature, when the power selling unit price is lower than the power purchase unit price, the control unit performs control such that power generated by the photovoltaic cell is preferentially consumed by a load.

In the first feature, the acquisition unit is a reception unit that receives the power purchase unit price via a network.

In the first feature, the acquisition unit is a reception unit that receives the power selling unit price via a network. The energy management system further comprises a control unit that controls the fuel cell; and an acquisition unit that acquires a power purchase unit price required for receiving supply of unit power from a grid and a unit price of the fuel cell required for the fuel cell to generate unit power. When the unit price of the fuel cell is higher than the power purchase unit price, the control unit controls the fuel cell, in a restrained state where output of the fuel cell is restrained.

In the first feature, the restrained state is a stop state where an operation of the fuel cell is stopped or an idle state of the fuel cell.

In the first feature, the restrained state is a stop state where an operation of the fuel cell is stopped. The control unit corrects the unit price of the fuel cell on the basis of a price required for stopping the operation of the fuel cell and restarting the operation of the fuel cell, and uses the corrected unit price of the fuel cell as the unit price of the fuel cell.

In the first feature, the restrained state is an idle state of the fuel cell. The control unit corrects the unit price of the fuel cell on the basis of a price required for maintaining the idle state, and uses the corrected unit price of the fuel cell as the unit price of the fuel cell.

An energy management apparatus according to the second feature is connected to a fuel cell. The energy management apparatus comprises: a control unit that controls the fuel cell; and an acquisition unit that acquires a power purchase unit price required for receiving supply of unit power from a grid and a unit price of the fuel cell required for the fuel cell to generate unit power. When the unit price of the fuel cell is higher than the power purchase unit price, the control unit controls the fuel cell, in a restrained state where output of the fuel cell is restrained.

A power management method according to the third feature is applied to an energy management system provided with a fuel cell. The power management method comprises: a step A of acquiring a power purchase unit price required for receiving supply of unit power from a grid; a step B of acquiring a unit price of the fuel cell required for the fuel cell to generate unit power; and a step C of controlling the fuel cell, in a restrained state where output of the fuel cell is restrained, when the unit price of the fuel cell is higher than the power purchase unit price.

DESCRIPTION OF THE EMBODIMENT

With reference to the drawings, the energy management system according to the embodiment of the present invention will be described. In the drawings of the following embodiments, the same or similar reference signs are applied to the same or similar portions.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

SUMMARY OF THE EMBODIMENT

The energy management system according to the embodiment is provided with a fuel cell. The energy management system comprises: a control unit that controls the fuel cell; and an acquisition unit that acquires a power purchase unit price required for receiving supply of unit power from a grid and a unit price of the fuel cell required for the fuel cell to generate unit power. When the unit price of the fuel cell is higher than the power purchase unit price, the control unit controls the fuel cell, in a restrained state where output of the fuel cell is restrained.

In the embodiment, when the unit price of the fuel cell is higher than the power purchase unit price, the control unit controls the fuel cell, in the restrained state where the output of the fuel cell is restrained. Therefore, a case where a price is rather increased by using the power output from the fuel cell, is restrained.

First Embodiment (Energy Management System)

Figure 1:
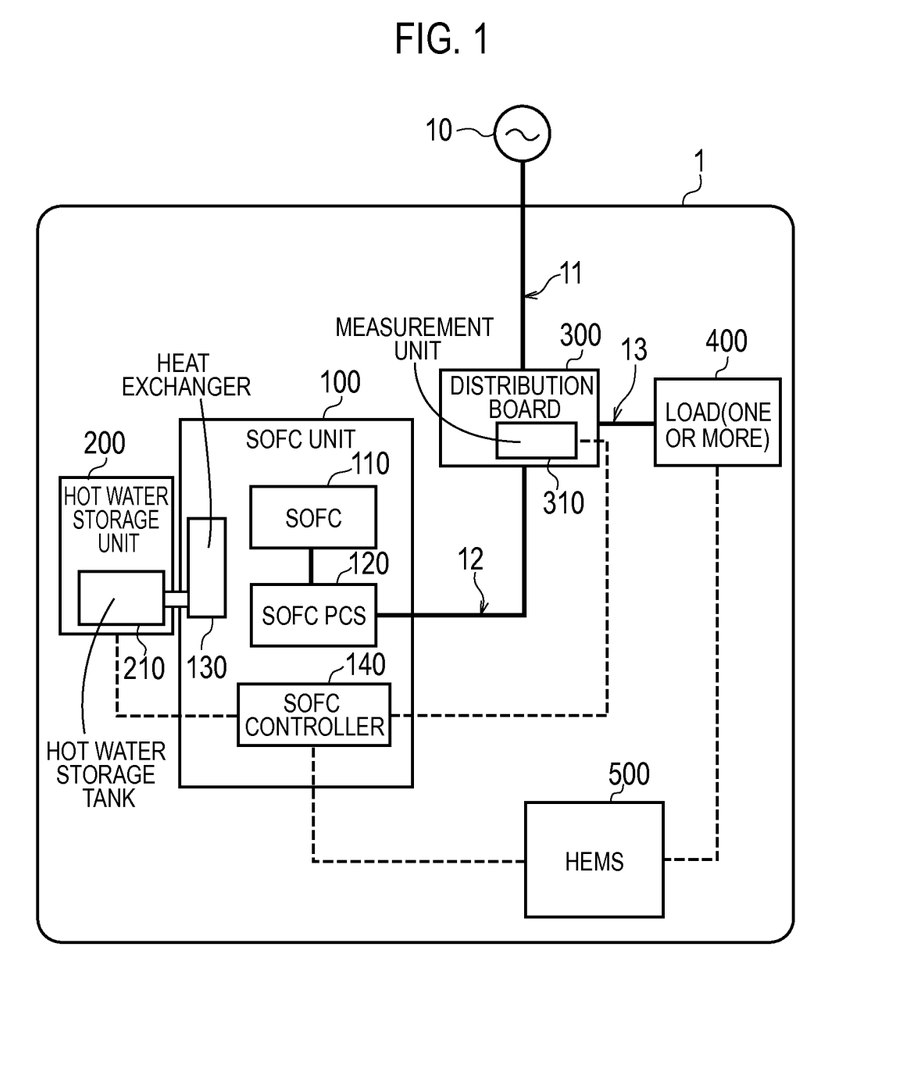
FIG. 1 is a diagram of a power management system 1 according to the first feature.

Hereinafter, an energy management system according to a first embodiment will be described. FIG. 1 is a diagram of a power management system 1 according to the first embodiment.

As shown in FIG. 1, the power management system 1 includes an SOFC unit 100, a distribution board 300, a load 400, and an HEMS 500.

The SOFC unit 100 is a unit including equipment (Solid Oxide Fuel Cell) that outputs power (for example, DC power) by a chemical reaction between hydrogen extracted from natural gas, for example, and oxygen in the air.

In particular, the SOFC unit 100 includes an SOFC 110, an SOFC PCS 120, a heat exchanger 130, and an SOFC controller 140.

The SOFC 110 is equipment (Solid Oxide Fuel Cell) that generates power (for example, DC power) by a chemical reaction between hydrogen extracted from gas, etc., and oxygen in the air. The SOFC 110 is an example of the fuel cell. An amount of power generation by the SOFC 110 varies depending on an amount of gas and air supplied to the SOFC 110. The amount of gas and air supplied to the SOFC 110 is controlled by the SOFC controller 140.

The SOFC PCS 120 converts the DC power output from the SOFC 110 into AC power. The SOFC PCS 120 outputs the AC power to the distribution board 300 via a power line 12.

The heat exchanger 130 is linked with a hot water storage tank 210 and warms water supplied form the hot water storage tank 210 with exhaust heat generated by an operation (power generation) of the SOFC 110. In particular, the heat exchanger 130 warms the water supplied form the hot water storage tank 210 and returns warmed hot water to the hot water storage tank 210. In this way, the exhaust heat generated by the operation (power generation) of the SOFC 110 is used for warming water supplied from the hot water storage tank 210.

The SOFC controller 140 performs control for performing a load following operation. Specifically, the SOFC controller 140 controls the SOFC 110 so that the power output from the SOFC unit 100 (SOFC 110) follows the power consumption of the load 400.

The SOFC controller 140 decides a target output power value of the SOFC unit 100 (SOFC 110) so that the power supplied from a grid 10 reaches a predetermined value (for example, zero). The SOFC controller 140 controls the SOFC 110 so that the power output from the SOFC unit 100 (SOFC 110) reaches a target output power value.

The power supplied from the grid 10 varies depending on the power consumption of the load 400. Therefore, it should be noted that even in a case of deciding the target output power value according to the power supplied from the grid 10, the power output from the SOFC unit 100 (SOFC 110) follows the power consumption of the load 400.

Alternatively, the SOFC controller 140 decides the target output power value equal to the power consumption of the load 400. The SOFC controller 140 controls the SOFC 110 so that the power output from the SOFC unit 100 (SOFC 110) reaches a target output power value.

In the first embodiment, the SOFC controller 140 notifies the temperature of the SOFC 110 during an operation to the HEMS 500. The temperature of the SOFC 110 during an operation can be measured by, for example, a thermometer provided together with the SOFC 110.

The hot water storage unit 200 has the hot water storage tank 210 linked with the heat exchanger 130. The hot water storage tank 210 stores the hot water warmed by the exhaust heat generated by the operation of the SOFC 110. Further, the hot water storage unit 200 has a function of controlling the amount of hot water stored in the hot water storage tank 210 by adjusting the amount of water supplied to the heat exchanger 130, and the like.

In this case, the hot water storage unit 200 notifies the amount of hot water stored in the hot water storage tank 210 to the HEMS 500 via the SOFC controller 140. The "amount of hot water stored" may be regarded as a value converted into temperature (that is, the amount of heat stored).

The distribution board 300 is connected to the grid 10 via a power line 11, connected to the SOFC unit 100 via a power line 12, and connected to the load 400 via a power line 13. The distribution board 300 distributes the power supplied from the grid 10 via the power line 11 and the power supplied from the SOFC unit 100 via the power line 12, to the load 400 via the power line 13.

In the first embodiment, the distribution board 300 includes the measurement unit 310. The measurement unit 310 measures the power supplied from the grid 10. In addition, the measurement unit 310 measures power consumption of the load 400

When there are provided a plurality of loads 400, the measurement unit 310 may measure a sum of power consumption of the loads 400, or may individually measure power consumption of each load 400.

In this case, the measurement unit 310 is connected to the SOFC unit 100 and the HEMS 500 via a signal line, and transmits a measured value to the SOFC unit 100 and the HEMS 500.

The load 400 is equipment that consumes the power supplied via the power line 13. Examples of the load 400 include equipment such as a refrigerator, lighting, an air conditioner, and TV. The load 400 may be single equipment, and may include a plurality of equipment.

The HEMS 500 is an apparatus (HEMS: Home Energy Management System) that manages the power of the consumer. The HEMS 500 is connected to the SOFC unit 100, the distribution board 300 (measurement unit 310), and the load 400 via a signal line. The HEMS 500 includes a function of controlling an operation mode of the load 400. The HEMS 500 is an example of an energy management apparatus.

Figure 2:
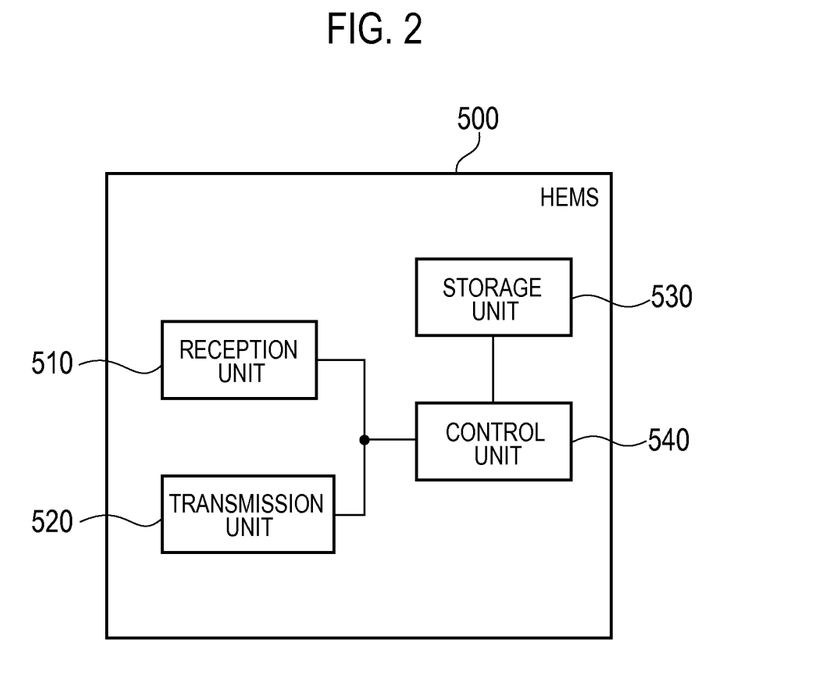
FIG. 2 is a block diagram of the HEMS 500 according to the first feature.

In particular, as shown in FIG. 2, the HEMS 500 includes a reception unit 510, a transmission unit 520, a specifying unit 530, and a control unit 540.

The reception unit 510 receives various types of information from the SOFC controller 140, the distribution board 300 (the measurement unit 310), and the load 400. For example, the reception unit 510 receives, from the SOFC controller 140, information indicating the amount of hot water stored in the hot water storage tank 210. The reception unit 510 may receive, from the measurement unit 310, power (measured value) supplied from the grid 10 or the power consumption (the measured value) of the load 400. The reception unit 510 may receive, from the load 400, load state information indicating a state (power ON/OFF, an operation mode) of the load 400.

In the first embodiment, the information indicating the amount of hot water stored in the hot water storage tank 210 is accumulated in the memory unit 530 which will be described below and the information is preferably managed in the memory unit 530 as a use history of hot water stored in the hot water storage tank 210.

The transmission unit 520 transmits various types of information to the SOFC unit 100 and the load 400. In particular, the transmission unit 520 transmits an SOFC control signal for controlling the SOFC 110 to the SOFC unit 100 (the SOFC controller 140).

In this case, the SOFC control signal is a signal for controlling the SOFC 110, in a restrained state where the output of the SOFC 110 is restrained. In this case, the restrained state indicates a state where the operation of the SOFC 110 is stopped (hereinafter, a stop state). Alternatively, the restrained state indicates a state of the SOFC 110 (an idle state). That is, the SOFC control signal is a signal for shifting the SOFC 110 into the stop state or a signal for shifting the SOFC 110 into the idle state.

The idle state indicates a state where the SOFC 110 has a temperature at which the SOFC 110 can output power outside, such that the SOFC 110 is immediately switched into an operation mode in which power can be transmitted to output electricity, however, a state where power is not output outside. It is known that slight power is needed especially for the operation of the fuel cell such as an SOFC 110 in supplying gas and the like due to a configuration of the fuel cell. A state where the fuel cell is slightly operated so that the fuel cell can generate and cover only power to be needed in such an operation, is called an idle state. Keeping such an idle state has an advantage that followability when the load requires power can be extremely high, compared with a case where the fuel cell is completely stopped, while minimizing gas consumption.

The memory unit 530 stores various types of information. Firstly, the memory unit 530 stores a power purchase unit price required for receiving supply of unit power from the grid 10. For example, the power purchase unit price is a price for receiving supply of 1 kWh power.

Secondly, the memory unit 530 stores the unit price of the fuel cell required for the SOFC 110 to generate unit power. For example, the unit price of the fuel cell is a price required for the SOFC 110 to generate 1 kWh power.

The memory unit 530 preferably stores information necessary to calculate the unit price of the fuel cell. For example, the memory unit 530 stores the unit price of gas supplied to the SOFC 110. The unit price of gas is, for example, the price of one cubic meter of gas.

Figure 3:
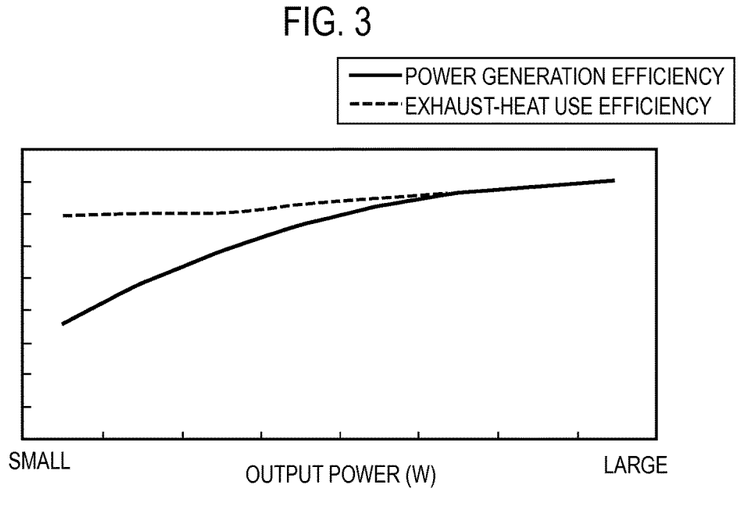
FIG. 3 is a diagram of the power generation efficiency and the exhaust-heat use efficiency according to the first feature.

In this case, the unit price of the fuel cell is different depending on the power generation efficiency of the SOFC 110. For example, as shown in FIG. 3, the smaller the output of the SOFC 110 is, the worse the power generation efficiency of the SOFC 110 is. In other words, the smaller the output of the SOFC 110 is, the more the unit price of the fuel cell is increased.

Thirdly, the memory unit 530 stores the exhaust-heat use efficiency of the SOFC 110 for each predetermined condition. The predetermined condition is, for example, a time zone and a season. The exhaust-heat use efficiency of the SOFC 110 is, as shown in FIG. 3, substantially constant without depending on the output of the SOFC 110.

However, it should be noted that, when demand for hot water (hereinafter, demand for hot water supply) is less than the amount of hot water stored in the hot water storage tank 210 (the amount of remaining hot water), and the amount of remaining hot water reaches a predetermined threshold value (for example, the upper limit amount of hot water that can be stored in the hot water storage tank 210), exhaust heat of the SOFC 110 is not needed.

Figure 4:
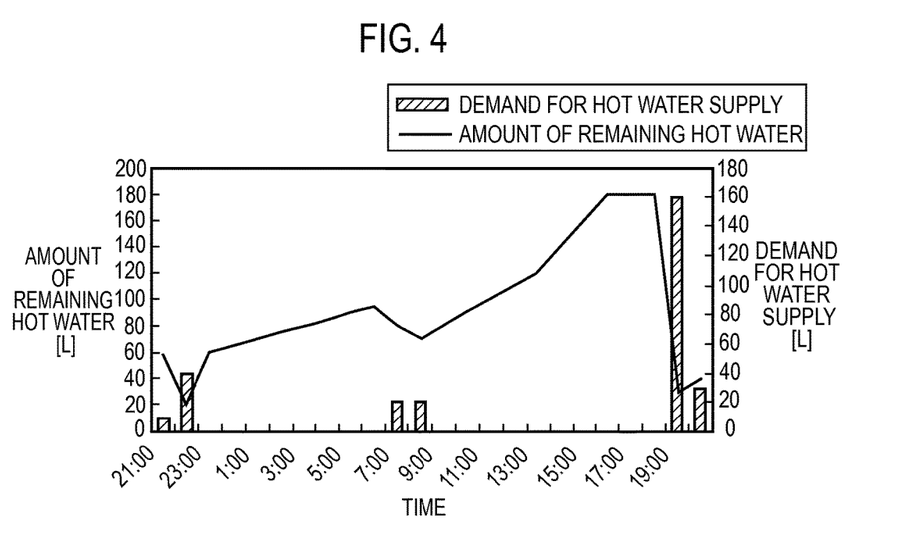
FIG. 4 is a diagram of the demand for hot water supply and the amount of remaining hot water according to the first feature.

For example, as shown in FIG. 4, there is demand for hot water supply in time zones of 19:00 to 23:00 and 7:00 to 9:00, however, there is no demand for hot water supply in the other time zones. Therefore, in the time zone of 17:00 to 18:00, since the amount of remaining hot water reaches a predetermined threshold value, the exhaust heat of the SOFC 110 is not needed. In other words, in the time zone of 17:00 to 18:00, the exhaust-heat use efficiency of the SOFC 110 is "zero".

It should be noted that the demand for hot water supply can be predicted by the use history of the hot water stored in the hot water storage tank 210.

The control unit 540 controls the HEMS 500. Specifically, the control unit 540 controls the output of the SOFC 110. For example, the control unit 540 controls the SOFC 110, in the restrained state where the output of the SOFC 110 is restrained.

In the first embodiment, when the unit price of the fuel cell is higher than the power purchase unit price, the control unit 540 controls the SOFC 110, in the restrained state. However, as will be described below, the unit price of the fuel cell may be corrected by the other parameters.

(a) The control unit 540 corrects the unit price of the fuel cell stored in the memory unit 530, on the basis of the exhaust-heat use efficiency, and when the corrected unit price of the fuel cell is higher than the power purchase unit price, the control unit 540 controls the SOFC 110, in the restrained state. For example, the control unit 540 corrects the unit price of the fuel cell to be a lower price as the exhaust-heat use efficiency is higher.

(b) In a case where the restrained state is the stop state, the control unit 540 corrects the unit price of the fuel cell stored in the memory unit 530, on the basis of a price required for stopping the operation of the SOFC 110 and restarting the operation of the SOFC 110, and when the corrected unit price of the fuel cell is higher than the power purchase unit price, the control unit 540 controls the SOFC 110, in the restrained state. For example, the control unit 540 corrects the unit price of the fuel cell to be a lower price as the price required for stopping the operation of the SOFC 110 and restarting the operation of the SOFC 110 is higher.

In this case, the price required for stopping the operation of the SOFC 110 and restarting the operation of the SOFC 110 is, for example, the price of power required for stopping the operation and restarting the operation.

(c) In a case where the restrained state is the idle state, the control unit 540 corrects the unit price of the fuel cell stored in the memory unit 530, on the basis of a price required for maintaining the idle state of the SOFC 110, and when the corrected unit price of the fuel cell is higher than the power purchase unit price, the control unit 540 controls the SOFC 110, in the restrained state. For example, the control unit 540 corrects the unit price of the fuel cell to be a lower price as the price required for maintaining the idle state is higher.

In this case, the price required for maintaining the idle state is, for example, the price of gas supplied to the SOFC 110 in the idle state.

The control unit 540 acquires, from the memory unit 530, various types of information such as the power purchase unit price, the unit price of the fuel cell, and the exhaust-heat use efficiency.

(Energy Management Method)

Figure 5:
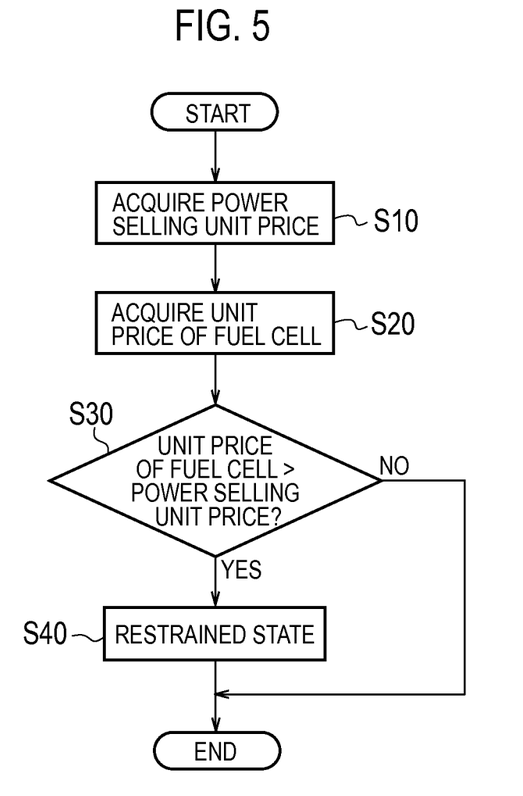
FIG. 5 is a flowchart showing the energy management method according to the first feature.

Hereinafter, an energy management method according to the first embodiment will be described. FIG. 5 is a flowchart showing the energy management method according to the first embodiment.

As shown in FIG. 5, in step 10, the HEMS 500 acquires the power purchase unit price.

In step 20, the HEMS 500 acquires the unit price of the fuel cell.

In step 30, the HEMS 500 determines whether or not the unit price of the fuel cell is higher than the power purchase unit price. When a determination result is "YES", the HEMS 500 proceeds to a process in step 40. Meanwhile, the HEMS 500 completes a series of processes when the determination result is "NO".

The HEMS 500 may use the unit price of the fuel cell corrected by various types of parameters as a unit price of the fuel cell that is compared with the power purchase unit price.

In step 40, the HEMS 500 controls the SOFC 110, in the restrained state where the output of the SOFC 110 is restrained. The restrained state is the stop state or the idle state.

(Operation and Effect)

In the first embodiment, when the unit price of the fuel cell is higher than the power purchase unit price, the HEMS 500 controls the SOFC 110, in the restrained state where the output of the SOFC 110 is restrained. Therefore, a case where a price is rather increased by using the power output from the SOFC 110, is restrained.

First Modification

Hereinafter, a first modification of the first embodiment will be described. Mainly differences from the first embodiment will be described below.

Figure 6:
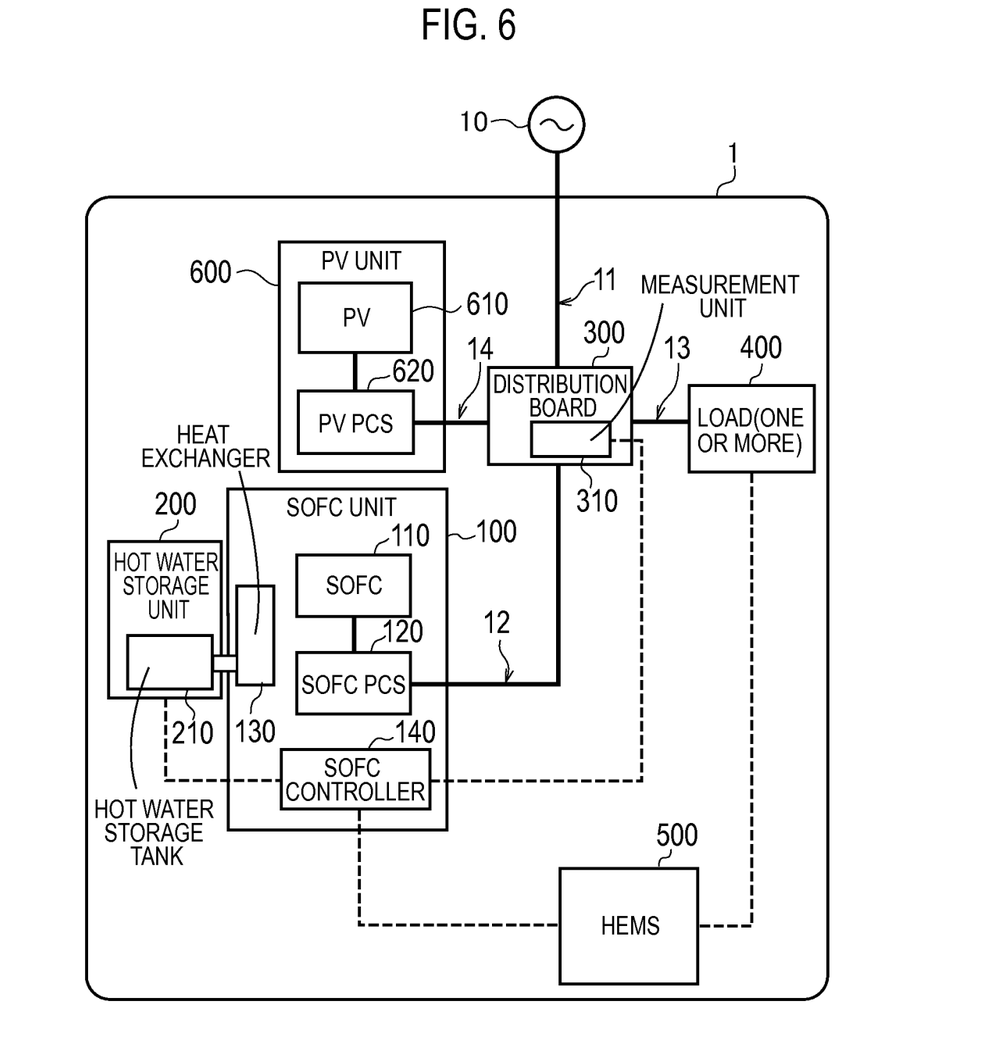
FIG. 6 is a diagram of a power management system 1 according to the first modification.

Specifically, in the first modification, the power management system 1 includes a PV unit 600 as shown in FIG. 6. The PV unit 600 has a PV 610 and a PV PCS 620.

The PV 610 generates power in accordance with received sunlight. The PV 610 outputs generated DC power. The amount of power generated by the PV 610 varies depending on the amount of solar radiation irradiated onto the PV 610.

The PV PCS 620 converts DC power output from the PV 610 into AC power. The PV PCS 620 outputs the AC power to the distribution board 300 via a power line 14.

In this case, the above-described memory unit 530 stores the power selling unit price of unit power generated by the PV 610. For example, the power selling unit price is a price for selling 1 kWh power.

Further, when the unit price of the fuel cell is higher than the power selling unit price, the above-described HEMS 500 (the control unit 540) controls the SOFC 110, in the restrained state. However, the unit price of the fuel cell may be corrected by other parameters, similarly to the first embodiment. The other parameters include, as described above, the exhaust-heat use efficiency, the price required for stopping the operation of the SOFC 110 and restarting the operation of the SOFC 110, the price required for maintaining the idle state, and the like.

The HEMS 500 (the control unit 540) acquires, from the memory unit 530, various types of information such as the power selling unit price, the unit price of the fuel cell, and the exhaust-heat use efficiency.

(Energy Management Method)

Figure 7:
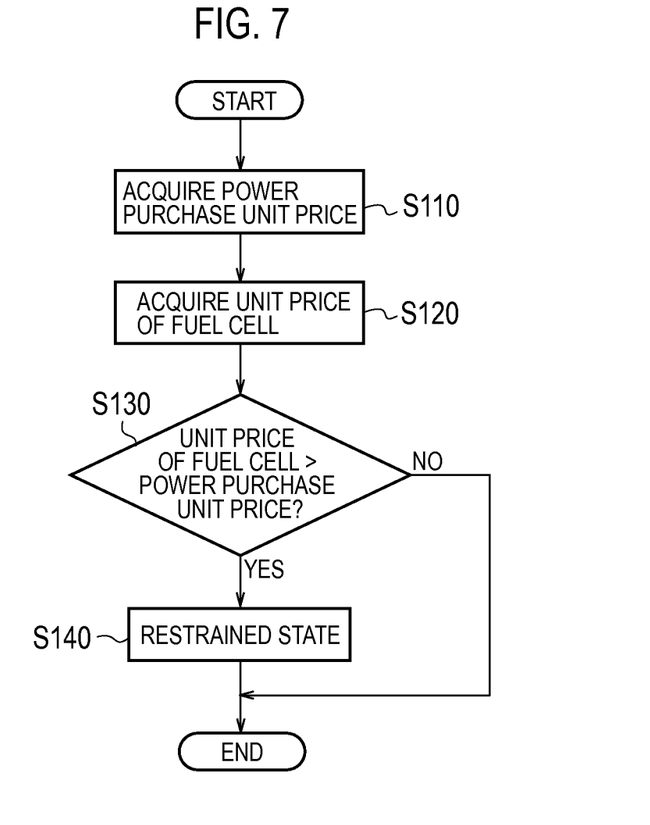
FIG. 7 is a flowchart showing the energy management method according to the first modification.

Hereinafter, an energy management method according to the first modification will be described. FIG. 7 is a flowchart showing the energy management method according to the first modification.

As shown in FIG. 7, in step 110, the HEMS 500 acquires the power selling unit price.

In step 120, the HEMS 500 acquires the unit price of the fuel cell.

In step 130, the HEMS 500 determines whether or not the unit price of the fuel cell is higher than the power selling unit price. When a determination result is "YES", the HEMS 500 proceeds to a process in step 140. Meanwhile, the HEMS 500 completes a series of processes when the determination result is "NO".

The HEMS 500 may use the unit price of the fuel cell corrected by various types of parameters as a unit price of the fuel cell that is compared with the power selling unit price.

In step 140, the HEMS 500 controls the SOFC 110, in the restrained state where the output of the SOFC 110 is restrained. The restrained state is the stop state or the idle state.

In the first modification, it should be noted that power is assumed to be generated by the PV 610.

Other Embodiments

As described above, the present invention has been described according to the embodiment. It must not be understood that, however, the discussions and the drawings constituting a part of this disclosure limit the present invention. From this disclosure, various alternative embodiments, examples and operational techniques will be apparent to those skilled in the art.

In the embodiment, as the energy management apparatus, the HEMS 500 is described as an example. However, the energy management apparatus may be a BEMS (Building and Energy Management System) or an FEMS (Factory Energy Management System), for example.

In the embodiment, various types of information including the power purchase unit price, the power selling unit price, the unit price of the fuel cell, the exhaust-heat use efficiency, and the like are stored in the memory unit 530, and the HEMS 500 (the control unit 540) acquires the various types of information stored in the memory unit 530. However, the embodiment is not limited thereto. The various types of information including the power purchase unit price, the power selling unit price, the unit price of the fuel cell, the exhaust-heat use efficiency, and the like may be received by the reception unit 510 via a network (a mobile communication network, a radio LAN, the Internet, and the like). In other words, the reception unit 510 constitutes the acquisition unit that acquires the various types of information including the power purchase unit price, the power selling unit price, the unit price of the fuel cell, the exhaust-heat use efficiency, and the like.

Although not particularly described in the embodiment, when the power selling unit price is lower than the power purchase unit price, the HEMS 500 (the control unit 540) controls the power generated by the PV 610 to be preferentially consumed by the load 400. That is, the power generated by the PV 610 is not sold but consumed by the load 400.

Although not particularly described in the embodiment, the first embodiment may be combined with the first modification. For example, when both of a condition (a) that the unit price of the fuel cell is higher than the power purchase unit price and a condition (b) that the unit price of the fuel cell is higher than the power selling unit price, are satisfied, the HEMS 500 may control the SOFC 110, in the restrained state where the output of the SOFC 110 is restrained. Alternatively, when either of the condition (a) and the condition (b) is satisfied, the HEMS 500 may control the SOFC 110, in the restrained state where the output of the SOFC 110 is restrained.

Although not particularly described in the embodiment, a function of the control unit 540 may be provided in an apparatus other than the HEMS 500.

Although not particularly described in the embodiment, communication in a network configured by the HEMS 500 and each equipment (the SOFC unit 100, the hot water storage unit 200, the distribution board 300, and the load 400) is preferably performed in compliance with a predetermined protocol (ECHONET Lite, ZigBEE SEP2.0, KNX, etc.). In such a case, between the HEMS 500 and each equipment (the SOFC unit 100, the hot water storage unit 200, the distribution board 300, and the load 400), various types of commands are communicated in a format defined in a predetermined protocol. For example, an SOFC control signal notified by the HEMS 500 to the SOFC unit 100, the load state information (power ON/OFF, operation mode) notified by the load 400 to the HEMS 500, and operation mode designation information (information for designating an operation mode of the load 400) notified by the HEMS 500 to the load 400 are notified in a format defined in a predetermined protocol.

Note that the entire content of the Japanese Patent Application No. 2011-213566 (filed on Sep. 28, 2011) is incorporated herein by reference.

INDUSTRIAL APPLICABILITY

According to the present invention, it is possible provide an energy management system, energy management apparatus and power management method capable, with which it is possible to reduce a whole price of power and gas by appropriately controlling a fuel cell unit.

The invention claimed is:

1. An energy management system provided with a fuel cell, comprising:
a controller that
controls the fuel cell, and
acquires a power purchase unit price required for receiving supply of unit power from a grid and a unit price of the fuel cell required for the fuel cell to generate unit power,
wherein, when the unit price of the fuel cell is higher than the power purchase unit price, the controller controls the fuel cell, in a restrained state where output of the fuel cell is restrained, wherein the restrained state comprises an idle state in which the fuel cell maintains a temperature at which the fuel cell can output power but does not output power.

2. The energy management system according to claim 1, wherein
the energy management apparatus is connected to a photovoltaic cell,
the controller acquires a power selling unit price of unit power generated by the photovoltaic cell, and
when the unit price of the fuel cell is higher than the power selling unit price, the controller controls the fuel cell, in the restrained state.

3. The energy management system according to claim 1, wherein
exhaust heat generated by an operation of the fuel cell is used for warming water by a hot water supply unit, and
the controller corrects the unit price of the fuel cell on the basis of use efficiency of the exhaust heat, and uses the corrected unit price of the fuel cell as the unit price of the fuel cell.

4. The energy management system according to claim 2, wherein when the power selling unit price is lower than the power purchase unit price, the controller performs control such that power generated by the photovoltaic cell is preferentially consumed by a load.

5. The energy management system according to claim 1, wherein the controller receives the power purchase unit price via a network.

6. The energy management system according to claim 2, wherein the controller receives the power selling unit price via a network.

7. The energy management system according to claim 1, wherein the controller corrects the unit price of the fuel cell on the basis of a price required for maintaining the idle state, and uses the corrected unit price of the fuel cell as the unit price of the fuel cell.

8. An energy management apparatus connected to a fuel cell, comprising:
a controller that
controls the fuel cell, and acquires a power purchase unit price required for receiving supply of unit power from a grid and a unit price of the fuel cell required for the fuel cell to generate unit power, wherein, when the unit price of the fuel cell is higher than the power purchase unit price, the controller controls the fuel cell, in a restrained state where output of the fuel cell is restrained, wherein the restrained state comprises an idle state in which the fuel cell maintains a temperature at which the fuel cell can output power but does not output power.

9. A power management method applied to an energy management system provided with a fuel cell, comprising, by a controller of the energy management system:

acquiring a power purchase unit price required for receiving supply of unit power from a grid;

acquiring a unit price of the fuel cell required for the fuel cell to generate unit power; and controlling the fuel cell, in a restrained state where output of the fuel cell is restrained, when the unit price of the fuel cell is higher than the power purchase unit price, wherein the restrained state comprises an idle state in which the fuel cell maintains a temperature at which the fuel cell can output power but does not output power.

* * * * *